(12) United States Patent
Wang et al.

(10) Patent No.: US 7,986,841 B2
(45) Date of Patent: Jul. 26, 2011

(54) METHOD AND APPARATUS FOR IMAGE EDGE DETECTION

(75) Inventors: Chi-Feng Wang, Taipei Hsien (TW);
Chun-Hsing Hsieh, Hsin-Chu (TW);
Chia-Wei Yu, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1221 days.

(21) Appl. No.: 11/616,844

(22) Filed: Dec. 27, 2006

(65) Prior Publication Data

US 2007/0154097 A1 Jul. 5, 2007

(30) Foreign Application Priority Data

Jan. 3, 2006 (TW) ................................ 95100234 A

(51) Int. Cl.
*G06K 9/48* (2006.01)
(52) U.S. Cl. ....................................... 382/199; 382/166
(58) Field of Classification Search .................. 382/199, 382/266
See application file for complete search history.

(56) References Cited

U.S. PATENT DOCUMENTS

| | | | | |
|---|---|---|---|---|
| 4,958,374 A * | 9/1990 | Tokita et al. | ................... | 382/149 |
| 4,985,764 A * | 1/1991 | Sato | ............................... | 348/448 |
| 5,974,197 A * | 10/1999 | Lee et al. | ....................... | 382/268 |
| 5,991,463 A * | 11/1999 | Greggain et al. | ............. | 382/298 |
| 6,674,903 B1 * | 1/2004 | Cliquet | .......................... | 382/199 |
| 6,707,940 B1 * | 3/2004 | Qian | .............................. | 382/173 |
| 7,412,096 B2 * | 8/2008 | Neuman et al. | ............... | 382/199 |
| 7,447,378 B2 * | 11/2008 | Kondo et al. | ................. | 382/266 |
| 2002/0191859 A1 * | 12/2002 | Amano et al. | ................ | 382/266 |
| 2007/0110319 A1 * | 5/2007 | Wyatt et al. | ................... | 382/199 |

OTHER PUBLICATIONS

Periodical—Chun-Chi Lin, "Shape Memorization and Recognition of 3-D Objects Using a Similarity-Based Aspect-Graph Approach", Jul. 2005, p. 11-12, fig.2-4.

* cited by examiner

*Primary Examiner* — Vu Le
*Assistant Examiner* — Michael Vanchy, Jr.
(74) *Attorney, Agent, or Firm* — Winston Hsu; Scott Margo

(57) ABSTRACT

An image edge detection method includes: classifying a plurality of candidate directions of an image region into a first direction set and at least one second direction set; computing a gradient for each candidate direction of the first direction set to obtain a first gradient set; determining if the first gradient set satisfies the conditions that one edge direction exists in the first direction set; and if the first gradient set does not satisfy the conditions, determining that none of the plurality of candidate directions is the edge direction of the image region.

14 Claims, 4 Drawing Sheets

METHOD AND APPARATUS FOR IMAGE EDGE DETECTION

BACKGROUND OF THE INVENTION

1. Field of the Invention

The present invention relates to image processing techniques, and more particularly, to methods and apparatuses for image edge detection.

2. Description of the Prior Art

Edge detection is a commonly-used process for many image processing operations such as image scaling or pixel interpolation. For example, the image scaling operation requires a reliable edge detection approach to improve the scaled image quality. Thus, there is a need for increasing the accuracy and reliability of the edge detection.

SUMMARY OF THE INVENTION

An objective of the claimed invention is to provide more reliable and accurate methods and apparatuses for image edge detection.

An exemplary embodiment of an edge detection method is disclosed comprising: classifying a plurality of candidate directions of an image region into a first direction set and at least one second direction set; computing a gradient for each candidate direction of the first direction set to obtain a first gradient set; determining if the first gradient set satisfies the conditions that one edge direction exists in the first direction set; and if the first gradient set does not satisfy the conditions, determining that none of the plurality of candidate directions being the edge direction of the image region.

An exemplary embodiment of an image edge detector is disclosed comprising: a storage unit for storing pixel data of an image region in which a plurality of candidate directions of the image region being classified into a first direction set and at least one second direction set; a gradient calculator coupled to the storage unit for computing a gradient for each candidate direction of the first direction set to obtain a first gradient set; and a decision unit coupled to the gradient calculator for determining if the first gradient set satisfies the conditions that one edge direction exists in the first direction set and determining that none of the plurality of candidate directions being the edge direction of the image region if the first gradient set does not satisfy the conditions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
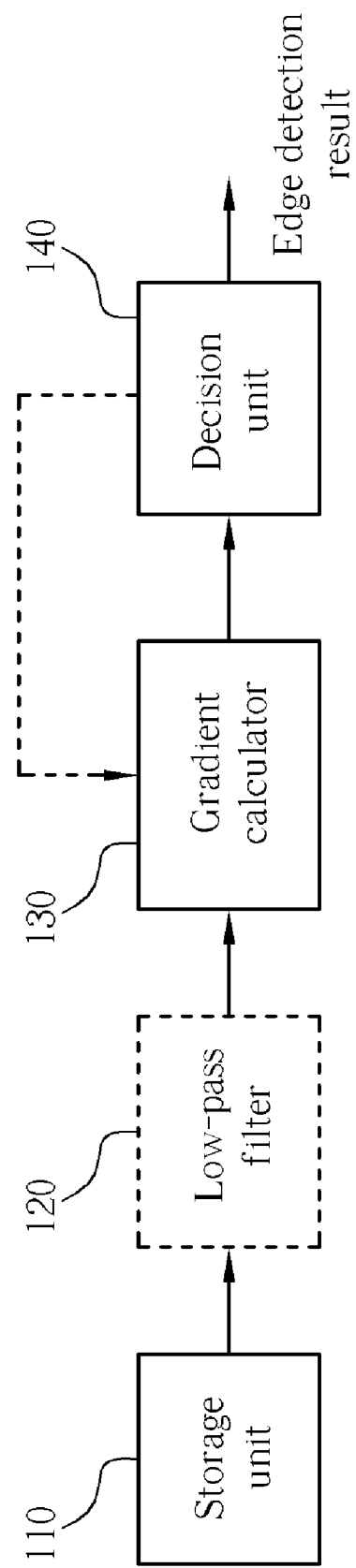
FIG. 1 is a block diagram of an image edge detector according to an exemplary embodiment of the present invention.

Please refer to FIG. 1, which shows a block diagram of an image edge detector 100 according to an exemplary embodiment of the present invention. The image edge detector 100 comprises a storage unit 110, a gradient calculator 130, and a decision unit 140. The storage unit 110 is arranged for storing pixel data of an image region. The gradient calculator 130 is arranged for computing a gradient for a direction to be detected in the image region. The decision unit 140 then identifies an edge direction for the image region according to the computed resulted of the gradient calculator 130. In practice, a low-pass filter 120 may be arranged between the storage unit 110 and the gradient calculator 130 to perform low-pass filtering operation on data to reduce high-frequency noise. Hereinafter, operations of the image edge detector 100 will be described with reference to FIG. 2 and FIG. 3.

Figure 2:
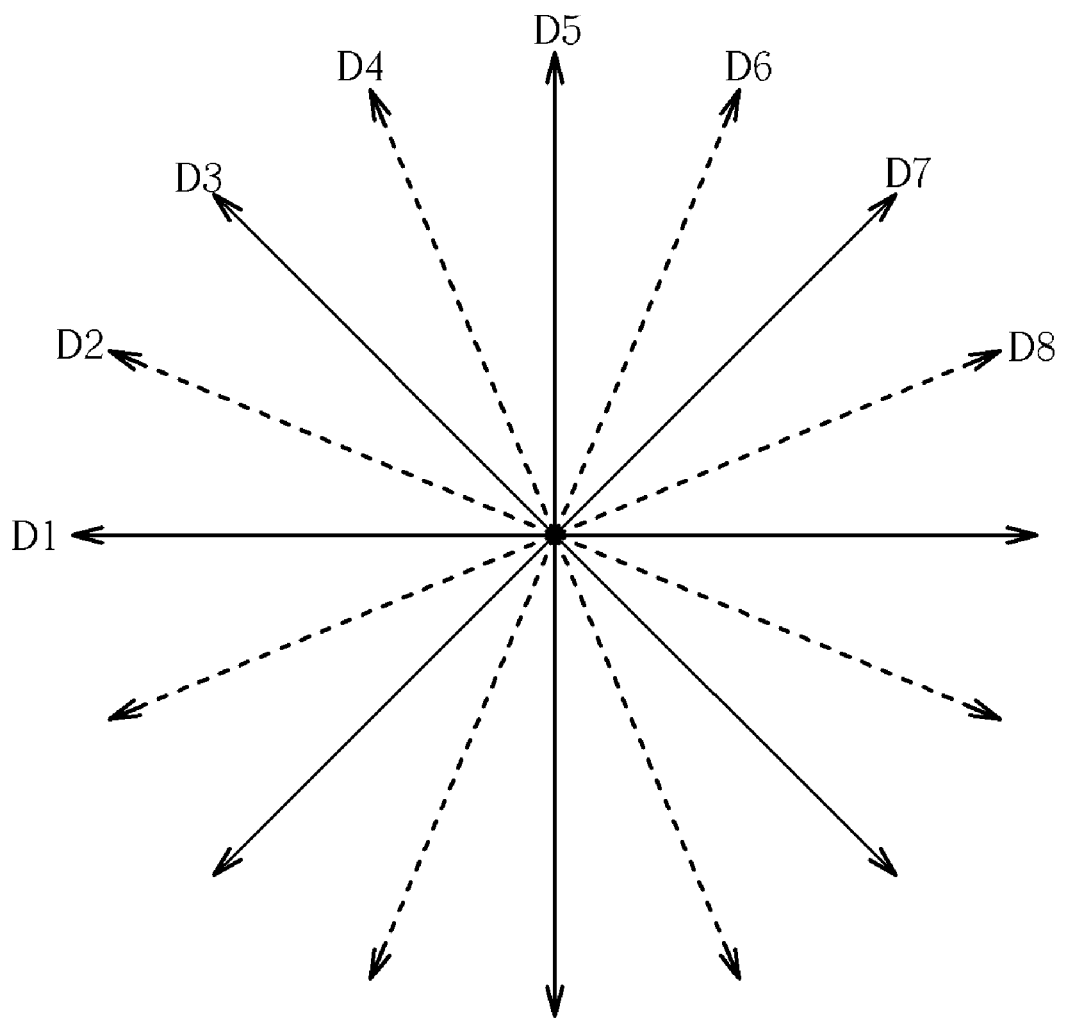
FIG. 2 is a schematic diagram of a plurality of candidate directions of an image region to be detected according to an exemplary embodiment of the present invention.
Figure 3:
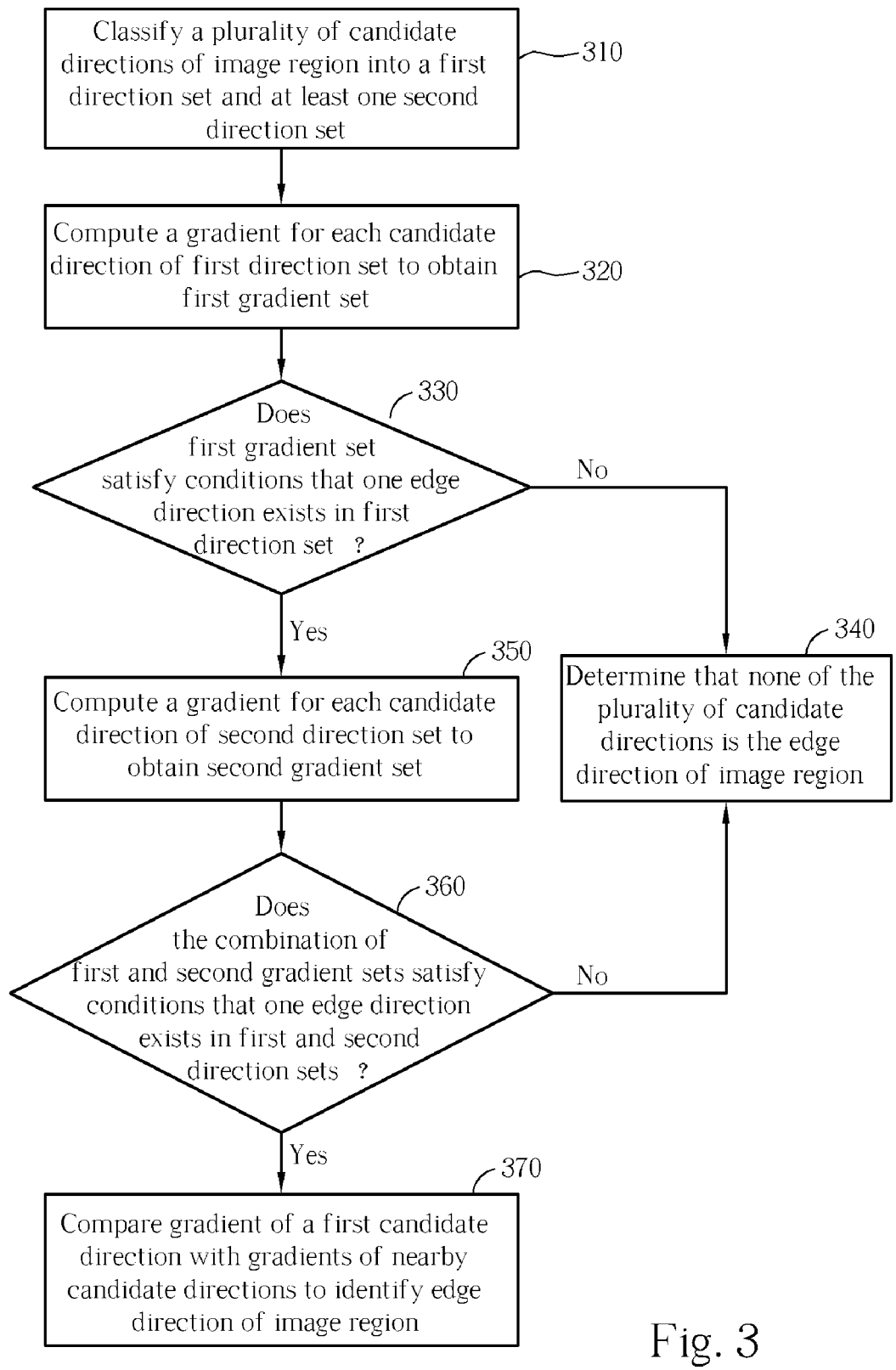
FIG. 3 shows a flowchart illustrating an image edge detection method according to an exemplary embodiment of the present invention.

FIG. 2 is a schematic diagram 200 of a plurality of candidate directions of an image region to be detected according to an exemplary embodiment. FIG. 3 shows a flowchart 300 illustrating an image edge detection method according to an exemplary embodiment of the present invention. For the purpose of explanatory convenience in the following descriptions, it is herein assumed that the image region to be detected has eight candidate directions D1, D2 through D8 as shown in FIG. 2. In practical implementations, the size and shape of the image region to be detected are determined by a design choice and not limited to any specific configurations.

In step 310, the image edge detector 100 classifies the eight candidate directions into a first direction set and at least a second direction set. According to experience, detection results of the gradients of the vertical direction, horizontal direction, and diagonal directions are more reliable than other directions. Accordingly, the candidate directions D1, D3, D5, and D7 are classified into the first direction set and the candidate directions D2, D4, D6, and D8 are classified into the second direction set in this embodiment. In a preferred embodiment, the angle between any two adjacent candidate directions classified in the first direction set and the second direction should be normalized. That means, the angle between any two adjacent candidate directions is substantially identical to any other two adjacent candidate directions. For example, the angle between direction D1 and direction D3 is substantially identical to the angle between direction D3 and direction D5.

In step 320, the gradient calculator 130 computes a gradient for each candidate direction of the first direction set to obtain a first gradient set. The gradient calculation for individual candidate direction is well known in the art, and further details are therefore omitted herein for the sake of brevity. Hereinafter, the gradients of the candidate directions D1, D3, D5, and D7 are assumed G1, G3, G5, and G7, respectively.

In step 330, the decision unit 140 then determines if the first gradient set (G1, G3, G5, and G7) satisfies the conditions that one edge direction exists in the first direction set. In this embodiment, the decision unit 140 calculates a gradient difference between a first candidate direction corresponding to the minimum gradient in the first gradient set and adjacent candidate directions, determines if a second candidate direction corresponding to the maximum gradient in the first gradient set is substantially perpendicular to the first candidate direction. For example, suppose that the minimum gradient in the first gradient set is G1, the maximum gradient in the first gradient set is G5, the decision unit 140 calculates a gradient difference between the candidate direction D1 corresponding to the gradient G1 and an adjacent candidate direction D3 and calculates a gradient difference between the candidate direction D1 and another adjacent candidate direction D7. In step 330, if both the gradient difference between the candidate directions D1 and D3 and the gradient difference between the candidate directions D1 and D7 are greater than a first threshold, and the second candidate direction is the candidate direction D5 that is perpendicular to the candidate direction D1, then the decision unit 140 determines that the first gradient set satisfies the conditions. Note that, this does not guarantee that the candidate direction D1 corresponding to the minimum gradient G1 of the first gradient set is the edge direction of the image region. The image edge detector 100 must perform the following steps to identify the actual edge direction of the image region.

However, if the first gradient set does not satisfy the conditions in step 330, then the decision unit 140 determines that none of the plurality of candidate directions is the edge direction of the image region (step 340). In such a situation, the gradient calculations of other gradient set can be omitted.

On the contrary, if the decision unit 140 determines that the first gradient set satisfies the conditions in step 330, the gradient calculator 130 then computes a gradient for each candidate direction of the second direction set (i.e., D2, D4, D6, and D8) to obtain a second gradient set in step 350. It is assumed that the gradients of the candidate directions D2, D4, D6, and D8 are G2, G4, G6, and G8, respectively.

Next, the decision unit 140 performs step 360 to determine if a third gradient set formed by the first and second gradient sets (i.e., G1, G2, G3 through G8) satisfies conditions that one edge direction exists in the first and second direction sets. In one embodiment, the decision unit 140 computes a first gradient combination corresponding to the candidate direction D1 and its nearby directions; computes a second gradient combination corresponding to the candidate direction D5 and its nearby directions; and determines if the third gradient set (i.e., the combination of the first and second gradient sets) satisfies the conditions according to the first and second gradient combinations. As described above, the candidate direction D1 corresponds to the minimum gradient G1 in the first gradient set, and the candidate direction D5 is perpendicular to the candidate direction D1.

For example, the decision unit 140 may perform a weighted-blending on the gradients of the candidate direction D1 and its adjacent directions D2 and D8 to obtain the first gradient combination in step 360. Similarly, the decision unit 140 may perform a weighted-blending on the gradients of the candidate direction D5 and its adjacent directions D4 and D6 to obtain the second gradient combination. In this embodiment, if the difference between the first and second gradient combinations is less than a second threshold, the decision unit 140 determines that none of the candidate directions of the first and second gradient sets is the edge direction of the image region. This is, none of the eight candidate directions shown in FIG. 2 is the edge direction of the image region. The weighted-blending is merely an example for calculating the gradient combination rather than a restriction of the practical implementations.

In another embodiment, the decision unit 140 calculates a gradient difference between adjacent candidate directions that are beside the candidate direction D1 and on the same side of the candidate direction D1, and then determines if the conditions that one edge exists in the first and the second direction sets are satisfied according to the gradient difference. For example, the decision unit 140 may determine that none of the candidate directions of the first and second direction sets is the edge direction of the image region when the gradient difference between the adjacent candidate directions D7 and D8, which are beside the candidate direction D1 and on the left-hand side of the candidate direction D1, is less than a third threshold. Alternatively, the decision unit 140 may calculate a gradient difference between the adjacent candidate directions D2 and D3 that are on the right-hand side of the candidate direction D1 to accordingly determine if the conditions that one edge exists in first and second direction sets are satisfied. In practice, the decision unit 140 can also judge that none of the candidate directions of the first and the second direction sets is the edge direction of the image region when both the gradient difference between the candidate directions D7 and D8 and the gradient difference between the candidate directions D2 and D3 are less than the third threshold.

If it is determined that the third gradient set satisfies said conditions that an edge direction exists in the first and the second direction sets in step 360, then the decision unit 140 performs step 370. In step 370, the decision unit 140 compares the gradient of the candidate direction D1 with gradients of nearby candidate directions to identify the edge direction of the image region. Hereinafter, the operations of the decision unit 140 in step 370 are described with reference to FIG. 4.

Figure 4:
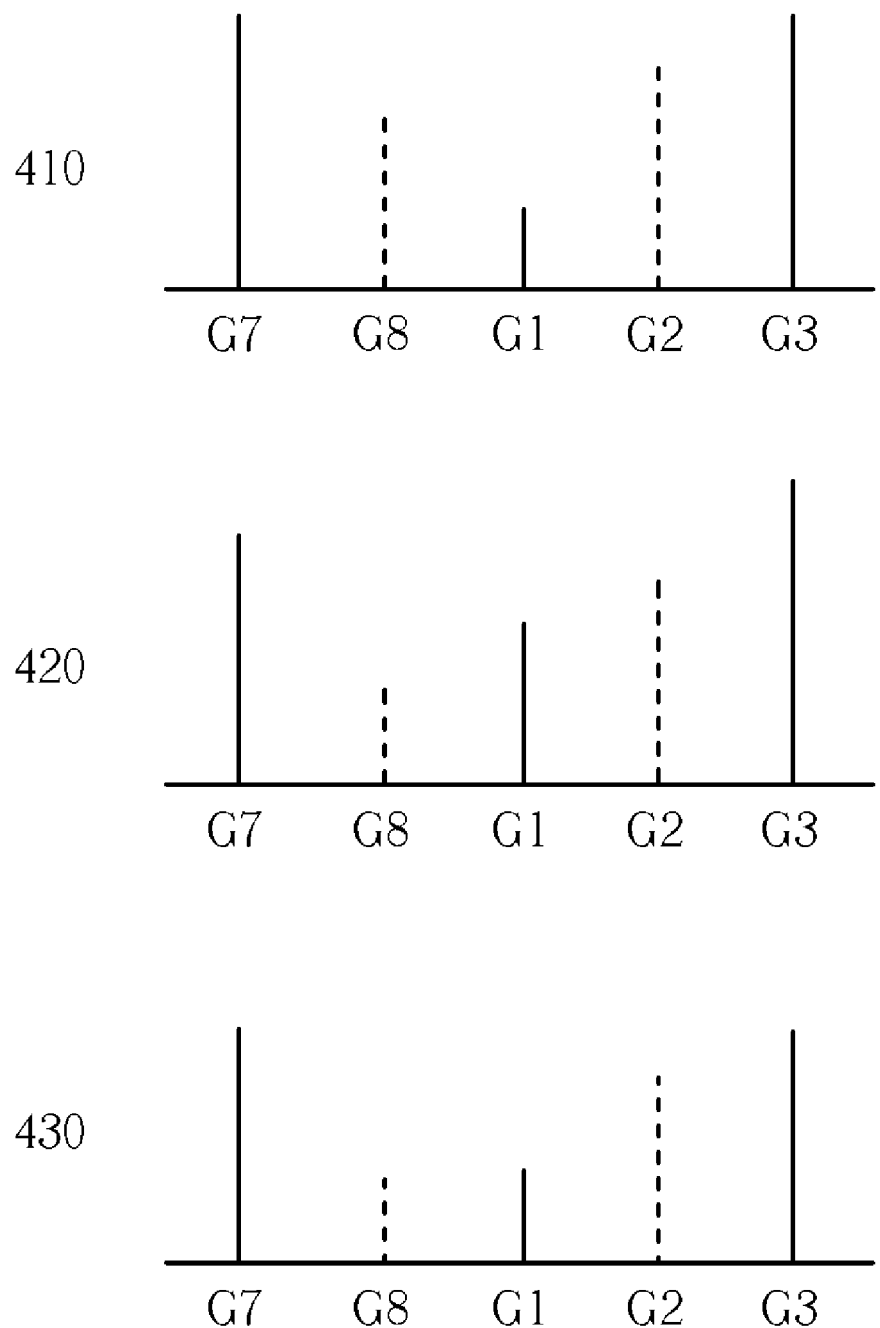
FIG. 4 is a schematic diagram illustrating three different gradient distributions according to an exemplary embodiment of the present invention.

FIG. 4 is a schematic diagram 400 illustrating three different gradient distributions according to an exemplary embodiment of the present invention. In a gradient distribution 410, since the minimum gradient G1 of the first gradient set is less than the nearby gradients G2 and G8, the decision unit 140 can simply determine that the candidate direction D1 corresponding to the gradient G1 is the edge direction of the image region. In a gradient distribution 420, the minimum gradient G1 of the first gradient set is less than the gradient G2 of the candidate direction D2 that is on the right-hand side of the candidate direction D1 but is greater than the gradient G8 of the candidate direction D8 that is on the left-hand side of the candidate direction D1. Therefore, the decision unit 140 judges that the candidate direction D8 corresponding to the gradient G8 is the edge direction of the image region. In a gradient distribution 430, the minimum gradient G1 of the first gradient set is less than the gradient G2 of the candidate direction D2 on the right-hand side of the candidate direction D1 but is equal to the gradient G8 of the candidate direction D8 on the left-hand side of the candidate direction D1. In such a scheme, the decision unit 140 compares the gradient G7 with the gradient G2 to determine which one of the candidate directions D8 and D1 is the edge direction of the image region. In one embodiment, if the gradient G7 is greater than the gradient G2, the decision unit 140 determines that the candidate direction D1 is the edge direction of the image region; on the contrary, the decision unit 140 determines that the candidate direction D8 is the edge direction of the image region.

As in the forgoing descriptions, the proposed edge detection method adopts a hierarchical detection approach in favor of the conventional approach, which compares the gradients of all candidate directions to identify a candidate direction having the minimum gradient as the edge direction of the image region to be detected. The hierarchical detection approach is capable of omitting the unnecessary gradient computations and significantly improving the accuracy of edge detection.

Please note that the execution order of the steps as presented in the flowchart 300 is merely an example rather than a restriction of the practical implementations. For example, step 350 can be performed prior to or at the same time with step 330. In practice, the number of candidate directions of the image region to be detected is not limited to eight as shown in the foregoing embodiments. Additionally, the hierarchical levels of the edge detection can be extended to three or more levels based on the system design requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An edge detection method comprising:
computing a gradient for each candidate direction of a first direction set of an image region to obtain a first gradient set, the first direction set comprising a vertical direction, a horizontal direction, and at least two candidate directions between the vertical direction and the horizontal direction;
calculating a first gradient difference between two predetermined candidate directions;
determining if a second candidate direction corresponding to a maximum gradient in the first gradient set is substantially perpendicular to a first candidate direction corresponding to a minimum gradient in the first gradient set; and
determining if an edge exists in the image region according to whether the first gradient difference is greater than a first threshold and whether the second candidate direction is substantially perpendicular to the first candidate direction.

2. The method of claim 1, wherein the two predetermined candidate directions are the first candidate direction and a candidate direction adjacent to the first candidate direction.

3. The method of claim 1, wherein the two candidate directions between the vertical direction and the horizontal direction are mutually perpendicular.

4. The method of claim 1, further comprising:
classifying a plurality of candidate directions of the image region into the first direction set and at least one second direction set;
if the edge exists in the image region because the first gradient difference is greater than the first threshold and the second candidate direction is substantially perpendicular to the first candidate direction, computing a gradient for each candidate direction of the second direction set to obtain a second gradient set; and
determining if the edge exists in the image region according to the first and the second gradient sets.

5. The method of claim 4, wherein the step of determining if the edge exists in the image region according to the first and the second gradient sets comprises:
computing a first gradient combination corresponding to the first candidate direction and its nearby directions;
computing a second gradient combination corresponding to the second candidate direction and its nearby directions;
calculating a difference between the first and the second gradient combinations; and
determining if the edge exists in the image region according to whether the difference is less than a second threshold.

6. The method of claim 4, wherein the step of determining if the edge exists in the image region according to the first and the second gradient sets comprises:
calculating a second gradient difference between adjacent candidate directions that are beside the first candidate direction and on the same side of the first candidate direction; and
determining if the edge exists in the image region according to whether the second gradient difference is less than a third threshold.

7. The method of claim 4, further comprising:
if the edge exists in the image region, identifying an edge direction of the image region by comparing a gradient of the first candidate direction with gradients of nearby candidate directions.

8. The method of claim 1, further comprising:
classifying a plurality of candidate directions of the image region into the first direction set and a plurality of second direction sets;
if the edge exists in the image region, respectively computing a plurality of second gradient sets corresponding to the plurality of second direction sets; respectively determining if the edge exists in the image region according to the first gradient set and each of the second gradient sets; and
if the edge exists in the image region comparing a gradient of the first candidate direction with gradients of nearby candidate directions to identify an edge direction of the image region.

9. An image edge detector comprising:
a storage unit for storing pixel data of an image region in which a plurality of candidate directions of the image region being classified into a first direction set and at least one second direction set, the first direction set comprising a vertical direction, a horizontal direction, and at least two candidate directions between the vertical direction and the horizontal direction;
a gradient calculator coupled to the storage unit for computing a gradient for each candidate direction of the first direction set to obtain a first gradient set; and
a decision unit coupled to the gradient calculator for calculating a first gradient difference between two predetermined candidate directions, determining if a second candidate direction corresponding to a maximum gradient in the first gradient set is substantially perpendicular to a first candidate direction corresponding to a minimum gradient in the first gradient set; and determining if an edge exists in the image region according to whether the first gradient difference is greater than a first threshold and whether the second candidate direction is substantially perpendicular to the first candidate direction.

10. The image edge detector of claim 9, wherein the gradient calculator computes a gradient for each candidate direction of the second direction set to obtain a second gradient set; and the decision unit determines if the edge exists in the image region because the first gradient difference is greater than the first threshold and the second candidate direction is substantially perpendicular to the first candidate direction.

11. The image edge detector of claim 10, wherein the decision unit further computes a first gradient combination corresponding to the first candidate direction and its nearby directions; computes a second gradient combination corresponding to the second candidate direction and its nearby directions; calculates a difference between the first and the second gradient combinations; and determines if the edge exists in the image region according to whether the difference is less than a second threshold.

12. The image edge detector of claim 10, wherein the decision unit further calculates a second gradient difference between adjacent candidate directions that are beside the first candidate direction and on the same side of the first candidate direction, and then determines if the edge exists in the image region according to whether the second gradient difference is less than a third threshold third.

13. The image edge detector of claim 10, wherein if the edge exists in the image region, the direction exists in the first and the second direction sets, the decision unit compares a gradient of the first candidate direction with gradients of nearby candidate directions to identify an edge direction of the image region.

14. The image edge detector of claim 9, wherein the plurality of candidate directions are classified into the first direction set and a plurality of second direction sets, if the edge exists in the image region, the gradient calculator respectively computes a plurality of second gradient sets corresponding to the plurality of second direction sets; the decision unit respectively determines if the edge exists in the image region according to the first gradient set and each of the second gradient sets; and the decision unit compares a gradient of the first candidate direction with gradients of nearby candidate directions to identify an edge direction of the image region.

* * * * *